United States Patent
Van Aken et al.

(10) Patent No.: US 6,470,395 B1
(45) Date of Patent: Oct. 22, 2002

(54) METHOD TO IMPOSE EXECUTION OF A PREDEFINED COMMAND, FIRST TERMINAL AND SECOND TERMINAL REALIZING SUCH A METHOD AND A COMMUNICATION NETWORK INCLUDING SUCH A FIRST TERMINAL AND SUCH A SECOND TERMINAL

(75) Inventors: Dirk Van Aken, Ganshoren (BE); Walter Gadeyne, Anzegem (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/422,145

(22) Filed: Oct. 20, 1999

(30) Foreign Application Priority Data

Oct. 21, 1998 (EP) .............................. 98402619

(51) Int. Cl.[7] .............................................. G06F 15/16
(52) U.S. Cl. ........................ 709/245; 709/208; 709/209; 709/237; 709/236
(58) Field of Search ................................. 709/245, 208, 709/209, 236–237

(56) References Cited

U.S. PATENT DOCUMENTS

| | | | |
|---|---|---|---|
| 6,292,838 B1 | * | 9/2001 | Nelson ........................ 709/236 |
| 6,330,615 B1 | * | 12/2001 | Gioquindo et al. ......... 709/236 |
| 6,216,168 B1 | * | 4/2002 | Dev et al. .................... 709/245 |
| 6,249,829 B1 | * | 6/2002 | Bloks et al. ................. 710/113 |

FOREIGN PATENT DOCUMENTS

| | | |
|---|---|---|
| EP | 0 094 177 A2 | 11/1983 |
| EP | 0 315 158 A2 | 5/1989 |
| EP | 0 809 383 A2 | 11/1997 |

OTHER PUBLICATIONS

Stevens et al, TCP/IP Illustrated, vol. 1, "The Protocols", published Oct. 1996.
Stevens et al, TCP/IP Illustrated, vol. 1, The Protocols, vol. 1, pp. 215–217 (same reference as above but only selected pages).

* cited by examiner

*Primary Examiner*—Dung C. Dinh
*Assistant Examiner*—Hieu C. Le
(74) *Attorney, Agent, or Firm*—Sughrue Mion, PLLC

(57) ABSTRACT

A method of imposing execution of a predefined command by a first terminal on a second terminal, in which a relation between an intended internet protocol address and the hardware address of the second terminal is inserted into a translation table in the first terminal and in which a reference to a predefined command is associated with the second hardware address, so that the predefined command is imposed by the first terminal upon the second terminal and is to be executed in the event of being addressed by a predefined message which includes the second hardware address.

13 Claims, 1 Drawing Sheet

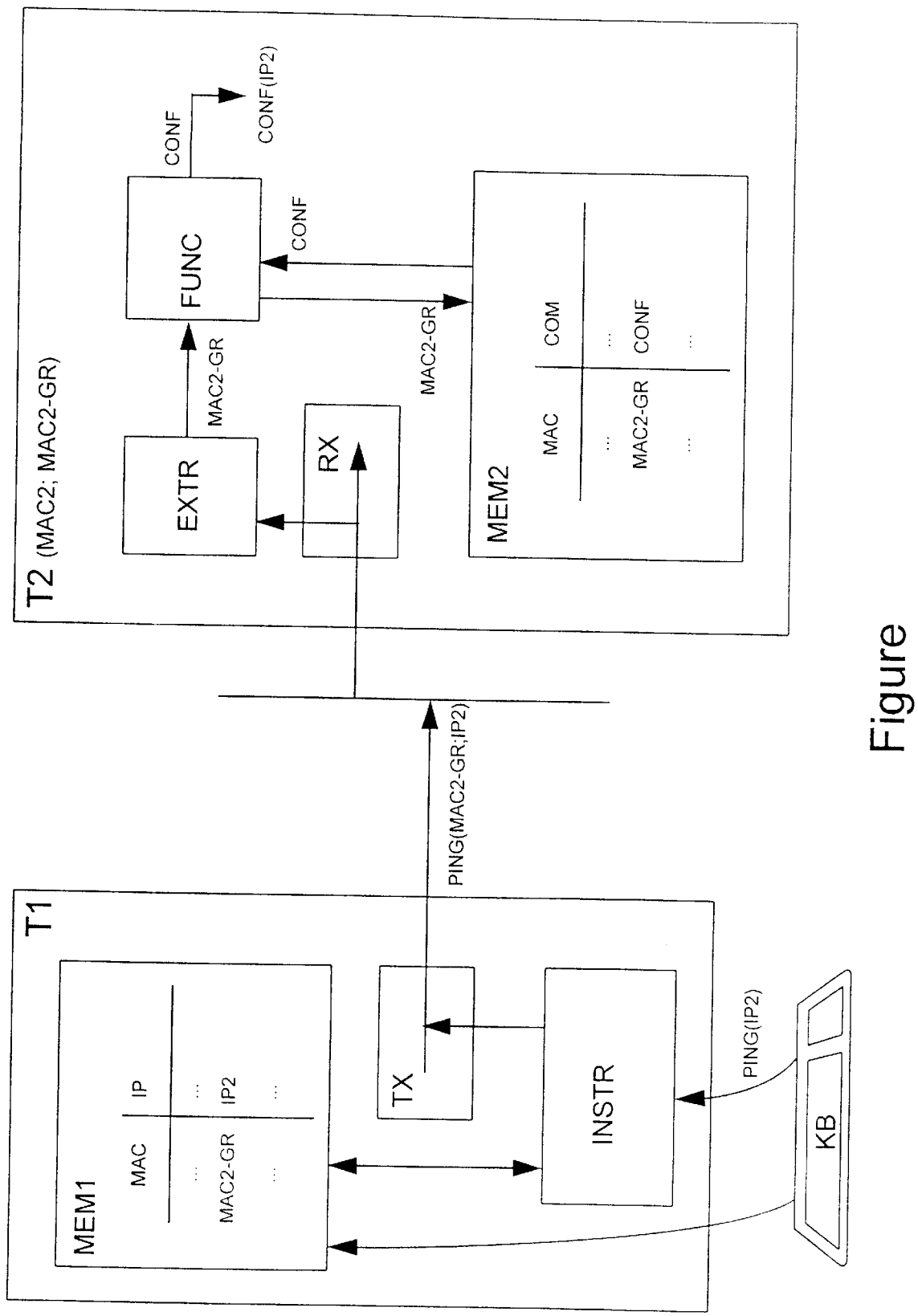
Figure

METHOD TO IMPOSE EXECUTION OF A PREDEFINED COMMAND, FIRST TERMINAL AND SECOND TERMINAL REALIZING SUCH A METHOD AND A COMMUNICATION NETWORK INCLUDING SUCH A FIRST TERMINAL AND SUCH A SECOND TERMINAL

BACKGROUND OF THE INVENTION

The present invention relates to a method to impose execution of a predefined command as described in the preamble of claim 1, to a first terminal and a second terminal realizing such a method as described in the preamble of claim 10 and claim 11, respectively, and a communication network including such a first terminal or such a second terminal as described in the preamble of claim 12.

A possible predefined command to be imposed by a first terminal upon a second terminal like e.g. an Asymmetric Digital Subscriber Line Network Terminator ANT is e.g. the configuration of the ANT with a predefined internet protocol address. Indeed, the assignment of an internet protocol address for an internet protocol terminal is required in order to enable this terminal to communicate in the internet protocol network. Even more, reconfiguration might be necessary in the event of misconfiguration. Indeed when such a terminal is to be coupled to a small existing Local Area Network, called LAN network, it is assumed to assimilate the network internet protocol number and the subnetwork internet protocol number of the existing network in order to avoid the use of routers.

Methods to impose execution of such a predefined command are already known in the art. Indeed dedicated hardware interfaces e.g. a serial interface to impose a predefined command upon a second terminal such as the above mentioned internet protocol address configuration of a network terminator are well known in the art. However such a dedicated hardware interface requires extra hardware and cables which might provide wiring problems.

Furthermore, many dedicated data link layer protocols of the second layer according to the seven layer open system interconnections OSI model can be developed which are however mostly proprietary solutions and wherefore however specific user interfaces have to be written in order to be used for multiple platforms.

It has to be remarked that an expression "physical layer address" is normally used according to the OSI model. An alternative term which is also used in the literature and which includes the same meaning is "hardware address". This term is preferred to be used in this application.

Also specific protocols which are working in a client/server mode like the Reverse Address Resolution Protocol RARP and the Bootstrap Protocol/Dynamic Host configuration BOOTP/DHCP which are initially using broadcast IP addresses in order to hand out IP addresses are used to impose execution of a predefined command such as configuration of a terminal with a predefined internet protocol address. These protocols are for example described in the book "*TCP/IP Illustrated*, Volume 1: The Protocols, written by W. Richard Stevens and published October 1996". The RARP protocol is described in chapter 5 of this book and the BOOTP is described in Chapter 16 of this book. However, these protocols require the presence of a server in the network which is not obvious in small e.g. private configurations.

SUMMARY OF THE INVENTION

An object of the present invention is to provide a method to impose execution of a predefined command by a first terminal upon a second terminal such as the above known methods but which do not have the above mentioned drawbacks of the need for an extra dedicated hardware interface or a dedicated server or development of proprietary user interfaces in order to enable use on multiple platforms.

According to the invention, this object is achieved by the method of claim 1 which is realized by the first terminal of claim 10 and the second terminal of claim 11 and by the communication network of claim 12 which includes such a first terminal or such a second terminal.

Indeed, the object is achieved due to the fact that the method of the invention includes the steps of:

a) entering in a first memory of the first terminal a relation between a second hardware and an intended internet protocol address. This second terminal is presubscribed to the second hardware address and the first memory is adapted to include at least one relation between a hardware address and an internet protocol address; and b) instructing the first terminal with a predefined instruction including an argument which is the intended internet protocol address. The first terminal includes an instructing means in order to receive and to execute the predefined instruction. It has to be remarked that in a further paragraph it will become clear that depending of the kind of predefined command this intended internet protocol address might have a value of any internet protocol address or that the intended internet protocol address must have a value of a predefined intended internet protocol address; and c) upon receiving of the predefined instruction by the first terminal transmitting a command packet to a terminal having a hardware address associated to the argument according to a relation in the first memory. The first terminal includes a transmitting means which is coupled to the instructing means in order to transmit the command packet which is received from the instructing means. The hardware address is associated to the intended internet protocol address according to the contents of the first memory. Indeed, due to the predefined instruction, the first memory is checked upon the presence of a relation with the internet protocol address of the argument of the predefined instruction which is the intended internet protocol address. It has to be explained that the first memory might include more than one relation concerning the intended internet protocol address. A hardware address which is associated to the intended internet protocol address is determined. Furthermore as a consequence of the predefined instruction the command packet is generated. The hardware address is included in the command packet and is the destination address whereby the command packet is launched on the medium towards the terminal which is subscribed to this hardware address; and d) in the event when the hardware address is the second hardware address whereby its terminal is the second terminal, upon receiving of the command packet by a receiving means of the second terminal, providing the included second hardware address to a function means of the second terminal. According to prior art protocols, once a data packet reaches the destination according to its hardware address, the hardware address is not used anymore. According to the method of the invention the hardware address i.e. the second hardware address is extracted from the command packet and provided to the function means. The second terminal includes an extracting means coupled to the receiving means in order to extract the second hardware address from the command packet and to provide the second hardware address to the function means; and e) upon receiving of the second hardware address by the function means generating the predefined command in order to be executed by the second terminal. Indeed, the received hardware address which is the second hardware address determines the predefined command. The address itself is the message.

In this way the basic idea of the invention is the fact that by inserting in a translation table i.e. the first memory of a first terminal a relation between an intended internet protocol address and the hardware address of the second terminal i.e. the second hardware address and by associating to the second hardware address a reference to a predefined command, the predefined command is imposed by the first terminal upon the second terminal and is to be executed in the event of being addressed by a predefined message which includes the second hardware address.

A further characteristic feature is described in claim 2. This feature is a possible implementation of the step of generating the predefined command which includes determining the predefined command according to a second memory included in the second terminal. Indeed, the second memory associates the second hardware address to the predefined command.

This feature becomes clear when looking to a possible situation whereby the relation in the first memory is implemented by a relation between an intended internet protocol address and a multicast hardware address. Such a multicast hardware address is a group hardware address which addresses due to e.g. some predefined bit settings in the hardware address, a total group of hardware addresses. This becomes clear when looking to the construction of an example of a hardware address being a Media Access Protocol address, called hereafter MAC address. Such a MAC address includes 6 bytes whereof the first 3 bytes are used to identify a group of addresses associated to e.g. a company. These 3 bytes are called the Organization Unique Identifier. The remaining bytes are free to be allocated by the owner of the group of addresses itself. When a predefined bit of the first 3 bytes is set, the MAC address being used as destination address ensures distribution of the message towards all the terminals which are subscribed to this MAC group address. This means that when the bit is set the MAC address acts as a multicast address. Furthermore, due to the construction of the MAC addresses, the values for the remaining 3 bytes are providing the possibility to generate, together with the setting of the predefined bit, a plurality of group addresses. Each group address is distinguished from one another by the value of its last 3 bytes.

In this way, when a second memory of a second terminal includes preconfigured relations between one of the group addresses and one of a plurality of predefined commands it is sufficient to subscribe, according to the present invention, the second terminal to a second hardware address which is one of the group addresses, and to address the second terminal with this group hardware address, whereby due to the preconfigured relation of the second memory the predefined command which is associated to the group address is imposed upon the second terminal.

Since the expression "being subscribed to a hardware address" will also be used later on in this application it is worthwhile to describe it in this paragraph. Indeed, as it is know to a person skilled in the art a terminal can only be subscribed to one unicast address but can furthermore be subscribed to different group addresses, also called multicast addresses. Subscription to a unicast address is usual implemented by preconfiguring e.g. at manufacturing time, the unicast address in a Programmable Read Only Memory PROM. On the other hand, subscription to a group address is usual implemented by configuration of an accessible memory at the time of activating the terminal. The use of such an accessible memory provides the advantage of upgrading a terminal when it is required.

A further characteristic feature is described in claim 3. Herein it is described that the method of the invention further includes that the step d) of providing the second hardware address to a function means of the second terminal is only executed in the event when a predefined condition is accomplished. Indeed, according to this way it is permitted to use for step b) a known predefined instruction which is however distinguished from the common use of this instruction by the accomplishment of the predefined condition. This feature will become clear with the following example. Presume the use of a ping instruction as a predefined instruction. A ping instruction is described in the above mentioned book, in chapter 7. As it is described in the summary part of this chapter on page 96, the ping instruction is a basic connectivity test between two systems which are running TCP/IP Transmission Control Protocol/Internet Protocol. This is a test which is used by a first terminal in order to find out whether another second terminal is reachable. The instruction includes sending by the first terminal a ping command packet to the second terminal and expects a reply to be returned. Furthermore, presume that the predefined condition is the condition of receiving a ping command packet by the second terminal within the first 60 seconds after being reset. In the event when the second terminal receives such a ping command packet within the first 60 seconds after being reset i.e. the predefined condition is accomplished, the ping command will be executed as usual i.e. returning a reply to the first terminal, but furthermore, the second hardware address included in the received ping common packet is provided to the function means of the second terminal.

The above mentioned example of a predefined command being a time moment of receiving the command packet during a predefined time period after resetting the second terminal is described in claim 4. It is clear to a person skilled in the art, that other kind of predefined conditions can be defined. Indeed, another possible implementation is initializing the start of the time window for receiving of a predefined command by just booting up the second terminal i.e. switch power on.

A further implementation of the present application is that the hardware address is a unicast media access control address or a group media access control address such as it is described in an earlier paragraph. This is described in claim 5.

Another possible implementation which is described in claim 6 is that the first memory of the first terminal is an address resolution protocol table which is adapted to include relations between a hardware address and an internet protocol address. Such an address resolution protocol table is e.g. an ARP Cache which is described at page 56 of the above mentioned book. It is indeed, possible to enter in such an ARP Cache a relation between a second hardware address and an intended internet protocol address. Such an entry is described in Section 4.8 at page 63 of the TCP/IP book.

Yet, another possible implementation of the present invention is described in claim 7 and constitutes the predefined instruction with an internet protocol instruction which controls availability of a terminal associated to an internet protocol address. The above described ping instruction is such an internet protocol instruction which can be used. Indeed, the ping instruction includes, as it is required for the current application, an argument. In order to use the ping instruction to realize step b) of the method according to the present invention, the intended internet protocol address must be pinged and is the argument included in the ping command. Since the ping instruction is supported on most internet protocol terminals it is a very convenient instruction to implement step b) of the present application.

A further possible implementation of such a predefined instruction is "TraceRoute" which also works with an argument and which has the purpose of finding the route to a terminal in the network.

Furthermore, it has to be explained that different predefined commands are possible. Indeed, a possible predefined command is, as it is already described above, the configuration of the second terminal with an intended internet protocol address. In such an event, the command packet must include the intended internet protocol address. The predefined command includes looking further into the command packet in order to extract the provided intended internet protocol address and configures the second terminal with this intended internet protocol address. This is described is claim 8. It has to be remarked that still other predefined commands are possible to be imposed by a first terminal upon a second terminal e.g. rebooting of the second terminal but e.g. without loosing personalized configurations and configuring of the second terminal according to the factory settings.

Finally, another implementation of reflecting a condition which must be accomplished in order to impose execution of the predefined command is that the second terminal is presubscribed to the second hardware address only during a predefined time period. This predefined time period can be determined e.g. similar to the above described implementation of a predefined condition i.e. a predefined time period after resetting the second terminal. Indeed, by preconfiguring the second terminal in such a way that after resetting of it, the terminal will be subscribed to the second hardware address and after elapsing of a predefined time period e.g. 60 seconds, the subscription to the second hardware address will be deleted, step d) of the method of the invention can only be executed when the second terminal is within the condition of 60 seconds after resetting it. This is described in claim 9 and provides the advantage that a user is able to make a selection of which terminal he wants to impose execution of a predefined command upon i.e. the terminal which has just been reset.

It should be noticed that the term "including", used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and in input of B which may be a path including other devices or means.

BRIEF DESCRIPTION OF THE DRAWING

The above and other objects and features of the invention will become more apparent and the invention itself will be best understood by referring to the following description of an embodiment taken in conjunction with the accompanying FIGURE which illustrates-a local area network LAN.

BRIEF DESCRIPTION OF THE INVENTION

First, the working of thee method of the present invention will be explained by means of a functional description of the functional blocks shown in the FIGURE. Based on this description, implementation of the functional blocks will be obvious to a person skilled in the art and will therefor not be described in further detail. In addition, the principle working of the method to impose execution of a predefined command will be described.

Referring to the FIGURE the LAN network includes a keyboard KB coupled to a first terminal T1 and a second terminal T2 which is an ADSL network terminator ANT. The first terminal T1 is coupled via the LAN network to the second terminal T2.

The first terminal T1 includes a first memory MEM1, an instructor INSTR and a transmitter TX. The first memory MEM1 is coupled to the keyboard and to the instructor INSTR. The instructor INSTR is also coupled to the keyboard KB and to the transmitter TX. The transmitter TX is coupled to an output of the first terminal T1.

It has to be remarked that the first memory MEM1 and the instructor INSTR are not directly coupled to the keyboard KB. Indeed, a receiver to receive entries and to distribute these entries to the appropriate functional blocks is included between. However, since this functional block is going beyond the aim of the present invention and furthermore in order not to overload the figure it is not shown in the FIGURE.

The first memory MEM1 is adapted to receive and to store entries of relations between hardware addresses and internet protocol addresses. It is preferred for this particular embodiment to implement the first memory MEM1 with an ARP Cache. As it is described above and ARP Cache is an address resolution protocol table which includes such relations between a hardware address and an internet protocol address. The hardware address is for this particular embodiment a media access control address MAC address. In order to show these relations in the FIGURE a table is included in the first memory MEM1. The first column includes a MAC address and the second column includes next to each MAC address a related internet protocol address. In this way the MAC2-GR address and the IP2 internet address are related to each other. It has to be understood that other kind of memories are available to include such relations and that other kind of implementations are possible to store a relation e.g. by reference to another table. The contents of an Arp Cache are usual maintained beyond the knowledge of a user of the first terminal T1. However, it is possible to a user to make an entry to the Arp Cache. This is described in section 4.8 Arp Command of the above mentioned document and will therefor here not further be described in detail.

The instructor INSTR is adapted to receive and to execute a predefined instruction with a predefined argument. For this particular embodiment it is preferred to use a ping instruction PING which includes as argument a predefined internet protocol address. The ping instruction is a well known basic connectivity test between two terminals which are running internet protocol. This test is used by e.g. the first terminal T1 in order to find out that e.g. the second terminal T2 is reachable. The instruction includes, according to this example, sending by the first terminal T1 a ping command with the internet protocol address of the second terminal T2 as argument. According to the known working of the ping instruction, first the Arp Cache will be checked upon the presence of a relation between the internet address of the argument e.g. IP2 of the ping command and a MAC address. In the event when such a relation is available in the Arp Cache MEM1, the associated MAC address e.g. MAC2-GR will be used to transmit a ping request to a terminal e.g. T2 which is subscribed to this associated MAC2-GR address. By making use of this ping command it has to be explained that the ping request includes besides the MAC2-GR address i.e. its destination address also the associated internet address at a predefined field in the ping request. Furthermore, in the event that the terminal receives such a ping request, the ping instruction requires a ping reply by the terminal in order to prove that it is reachable. It has to be remarked that in the event when no relation between the internet protocol address of the argument is available in the Arp Cache, the ping command includes further prosecutions which are however not relevant to the present application. Indeed, according to the first step of the method of the present application, a suitable entry will be made in the first memory MEM1. This will become more clear in a further paragraph.

The generated ping request e.g. PING(MAC2-GR;IP2) is thus the command packet which is generated by the instructor INSTR. The associated hardware address included in the command packet is the MAC address being associated to the internet protocol address of the argument of the ping instruction.

The transmitter TX is adapted to receive from the instructor INSTR a command packet e.g. PING(MAC2-GR;IP2) and to transmit this command packet via the LAN network to the terminal being subscribed to the included destination address i.e. MAC address.

The ADSL network terminator T2 comprises a receiver RX, an extractor EXTR, a function determiner FUNC and a second memory MEM2. The receiver RX is coupled to the extractor EXTR which on its turn is coupled to the function determiner FUNCT. The function determiner FUNCT is coupled to the second memory MEM2 and includes furthermore one extra output (shown with an arrow).

It has to be described here that the second terminal T2 is preconfigured to a subscription to a unicast MAC address i.e. MAC2. According to this particular embodiment it is preferred to implement also a temporarily configuration of the ADSL network terminator T2 with some group MAC addresses of the manufacturer e.g. MAC2-GR. The second terminal T2 will be subscribed to these addresses only during the first 60 seconds after being reset. This means that the second terminal T2 will look into data packets with as destination address the unicast address MAC2 and in the event of just being reset, the second terminal T2 will also look, during a time period of 60 seconds, into data packets with as destination address one of the group addresses e.g. MAC2-GR.

The receiver RX is coupled to an input of the second terminal T2 in order to receive incoming data e.g. a command packet. How the receiver RX determines which data packet includes a destination address according to the above paragraph is not described here in further detail. The aim is that the receiver RX receives the data packets meant for the second terminal T2 and that when the data packet is a command packet e.g. PING(MAC2-GR; IP2) it provides the data packet to the extractor EXTR. It has to be explained that a Ping command is normally done with an argument which is associated to a unicast address. As it will become clear in a further paragraph, according to this particular embodiment, the Ping command will also be used with arguments being associated to group addresses. In the event when the receiver RX receives such a ping command with as destination address one of its subscribed group addresses, and not its subscribed unicast address, the receiver knows that it received not a usual ping command but a command packet according to the present invention. Therefor the receiver RX provides the command packet according to the present invention to the extractor EXTR.

The extractor EXTR extracts from the received command packet e.g.

PING(MAC2-GR;IP2) the hardware destination address and provides this extracted hardware address e.g. MAC2-GR to the function determiner FUNC.

The function determiner FUNC needs to generate the predefined command e.g. CONF(IP2) in order to be executed by the second terminal T2. Since for this particular embodiment it is preferred to implement more than one predefined command to be executed by the second terminal T2, the function determiner FUNC first consults the second memory MEM2 in order to find out which predefined command e.g. CONF is associated to the extracted hardware address.

The second memory MEM2 is preconfigured with one-to-one relations between hardware addresses and predefined commands. This is implemented by means of a table which includes in the first column a list of hardware addresses and in the second column, next to each hardware address, a predefined command. The chosen hardware addresses are identical to the group addresses mentioned above e.g. MAC2-GR. It has to be remarked that the second memory MEM2 could be implemented in other ways. However, this goes beyond the scope of the invention.

One of the predefined commands will be described here in further detail i.e. the configuration command CONF. The configuration command includes configuring the second terminal T2 with the internet protocol address included in the received command packet. Therefor once the function determiner FUNC generates the configuration command CONF and the second terminal T2 starts execution of the configuration command CONF, one of the first actions to be done is extracting of a predefined field of the received command packet the intended internet protocol address.

In this way, it is for instance possible to subscribe the second terminal T2 to a desired internet protocol address e.g. IP2.

This example is preferred to describe in the following paragraph the principle working of the method to impose execution of a predefined command.

Presume a situation whereby the ADSL network terminator T2 needs to be configured with an internet protocol address. The internet protocol address is determined according to the actual active internet protocol addresses of the terminals being coupled to the LAN network. In order to avoid the use of routers it is assumed, as already described above, that the second terminal T2 needs to assimilate the network internet protocol number and the subnetwork internet protocol number of the existing LAN network. Presume that IP2 is a suitable internet protocol number i.e. the intended internet protocol number.

A user of the first terminal T1 needs to make an entry in the Arp cache MEM1 of its terminal T1. The entry includes the relation between the intended internet protocol address IP2 and a predefined group hardware address via which the configuration command will be imposed. This group hardware address might be described in e.g. the user manual of the second terminal T2. Presume that according to this information the needed hardware address is MAC2-GR. Thus the entry includes the relation between MAC2-GR and IP2.

Hereafter, the second terminal T2 is to be reset. This means that during the next 60 seconds the second terminal T2 is also subscribed to the group hardware address MAC2-GR.

During these 60 seconds the user instructs the instructor INSTR of the first terminal T1 with a ping instruction. The ping instruction includes as argument the intended internet protocol address IP2. According to the PING(IP2) instruction the Arp Cache MEM1 will be checked upon the presence of a relation with IP2. Since this relation has just been entered, it is available. A ping command packet is created with destination address MAC2-GR and is launched by the transmitter TX on-the network. Since the second terminal T2 is subscribed to this MAC2-GR hardware address, it will accept the command packet by the receiver RX. The receiver RX recognizes the ping command packet PING(MAC2-GR;IP2) which includes not the usual unicast address and provides therefor the command packet PING (MAC2-GR;IP2) to the extractor EXTR. The extractor EXTR extracts the hardware address of the ping command packet and provides this to the function determiner FUNC. The function determiner looks up in the second memory MEM2 and finds the associated predefined command i.e. CONF. The function determiner FUNC generates this configuration command CONF whereby the second terminal T2 starts with the execution of the configuration function. Firstly a predefined field of the received command packet PING(MAC2-GR;IP2) is verified in order to extract the intended IP2 address. Hereafter the second terminal T2 configures itself with the IP2 address as it was intended.

It has to be remarked that according to the ping instruction a reply will be transmitted from the second terminal T2 to the first terminal T1. The unicast address MAC2 of the second terminal T2 is included in this reply as the source address of the reply packet. Furthermore the reply packet includes also the internet protocol address of the source terminal i.e. IP2. When the first terminal T1 receives the reply packet, its arp cache will be automatically updated whereby the previous entered relation will be overwritten with newly received information i.e. the relation between the unicast address MAC2 and the internet protocol address IP2. In this way an advantage of the ping instruction becomes clear since the Arp Cache is now correct in order to transmit following packets to the second terminal T2.

While the principles of the invention have been described above in connection with specific apparatus, it is to be clearly understood that this description is made only by way of example and not as a limitation on the scope of the invention, as defined in the appended claims.

What is claimed is:

1. Method to impose execution of a predefined command (CONF) by a first terminal (T1) upon a second terminal (T2), said second terminal being coupled to said first terminal, characterized in that said method includes the steps of:
   a) entering in a first memory (MEM1) of said first terminal (T1) a relation between a second hardware address (MAC2-GR) and an intended internet protocol address (IP2), said second terminal (T2) being presubscribed to said second hardware address (MAC2-GR) and said first memory (MEM1) being adapted to include at least one relation between a hardware address and an internet protocol address; and
   b) instructing said first terminal (T1) with a predefined instruction (PING(IP2)) which includes an argument being said intended internet protocol address (IP2); and
   c) upon receiving of said predefined instruction (PING (IP2)) by said first terminal (T1) transmitting a command packet (PING(MAC2-GR;IP2)) to a terminal having a hardware address associated to said argument according to a relation in said first memory (MEM1), said command packet (PING(MAC2-GR;IP2)) including said hardware address (MAC2-GR);
   d) in the event when said hardware address is said second hardware address (MAC2-GR) whereby said terminal is said second terminal (T2), upon receiving of said command packet (PING(MAC2-GR; IP2)) by said second terminal (T2), providing said second hardware address (MAC2-GR) to a function means (FUNC) of said second terminal (T2); and
   e) upon receiving of said second hardware address by said function means (FUNC) generating said predefined command (CONF) in order to be executed by said second terminal (T2).

2. Method to impose execution of a predefined command according to claim 1, characterized in that said step of generating said predefined command includes determining said predefined command according to a relation between said hardware address and said predefined command being stored in a second memory (MEM2) included in said second terminal (T2).

3. Method to impose execution of a predefined command according to claim 1, characterized in that said method further includes executing said step d) only in the event when a predefined condition is accomplished.

4. Method to impose execution of a predefined command according to claim 3, characterized in that said predefined condition is that a time moment of receiving said command packet occurs during a predefined time period after resetting of said second terminal.

5. Method to impose execution of a predefined command according to claim 1, characterized in that said hardware address is any one of an unicast media access control address (MAC2) and a group media access control address (MAC2-GR).

6. Method to impose execution of a predefined command according to claim 1, characterized in that said first memory (MEM1) of said step a) being accomplished with an address resolution protocol table adapted to include relations between one of a plurality of a hardware addresses (MAC2-GR) and one of a plurality of internet protocol addresses (IP2).

7. Method to impose execution of a predefined command according to claim 1, characterized in that said step c) is accomplished with an internet protocol instruction (PING) which controls availability of a terminal associated to an internet protocol address.

8. Method to impose execution of a predefined command according to claim 1, characterized in that said command packet (PING(MAC2-GR;IP2)) further includes said intended internet protocol address (IP2) and that said predefined command is accomplished by configuration (CONF) of said second terminal (T2) with said intended internet protocol address (IP2).

9. Method to impose execution of a predefined command according to claim 1, characterized in that said second terminal (T2) is presubscribed to said second hardware address (MAC2-GR) during a predefined time period.

10. A first terminal (T1) to impose execution of a predefined command upon a second terminal (T2) which is coupled to said first terminal, characterized in that said first terminal (T1) includes:

a) a first memory (MEM1) to receive and to store an entry of a relation between a second hardware address (MAC2-GR) and an intended internet protocol address (IP2), said first memory (MEM1) being adapted to include at least one relation between a hardware address and an internet protocol addresses, said second terminal (T2) being presubscribed to said second hardware address (MAC2-GR); and b) instructing means (INSTR) in order to receive and to execute a predefined instruction (PING(IP2)) which includes an argument being said intended internet protocol address (IP2) and to thereby generate a command packet (PING(MAC2-GR;IP2)), said command packet including a hardware address (MAC2-GR) being associated to said argument according to said first memory (MEM1); and c) transmitting means (TX) being coupled to said instructing means (INSTR) in order to transmit said command packet (PING(MAC2-GR;IP2)) received from said instructing means (INSTR) to a terminal being subscribed to said hardware address, and in the event when said hardware address is said second hardware address (MAC2-GR) whereby said terminal is said second terminal (T2), to enable thereby said second terminal (T2) upon receiving of said command packet to provide said second hardware address (MAC2-GR) to a function means (FUNC) of said second terminal (T2) and to enable thereby said function means (FUNC) upon receiving of said second hardware address (MAC2-GR) to generate said predefined command (CONF) in order to be executed.

11. A second terminal (T2) to start execution of a predefined command under the imposition of a first terminal (T1) coupled to said second terminal (T2) characterized in that said second terminal (T2) includes:

receiving means (RX) to receive a command packet (PING(MAC2-GR;IP2)) in the event when a hardware address is constituted with a second hardware address (MAC2-GR) whereto said second terminal (T2) is presubscribed and whereby a terminal is constituted with said second terminal, said command packet being transmitted by said first terminal (T1) to said terminal upon receiving of a predefined instruction (PING(IP2)), said terminal being subscribed to said hardware address, said hardware address being associated to an intended internet protocol address (IP2) according to a relation included in a first memory (MEM1) of said first terminal (T1), said predefined instruction (PING(IP2)) including an argument being said intended internet protocol address (IP2), said relation being a relation between said intended internet protocol address (IP2) and said second hardware address (MAC2-GR) and being entered in said first memory (MEM1), said first memory (MEM1) being adapted to include at least one relation between a hardware addresses and an internet protocol addresses; and extracting means (EXTR) coupled to said receiving means (RX) to extract said second hardware address (MAC2-GR) from said command packet (PING(MAC2-GR;IP2)) and to provide said second hardware address (MAC2-GR) to function means (FUNC); and said function means (FUNC) coupled to said extracting means (EXTR) to generate upon receiving of said second hardware address (MAC2-GR) said predefined command (CONF) in order to be executed by said second terminal (T2).

12. A communication network characterized in that said communication network includes a first terminal (T1) according to claim 10.

13. A communication network characterized in that said communication network includes a second terminal according to claim 11.

* * * * *